United States Patent Office 3,447,185
Patented June 3, 1969

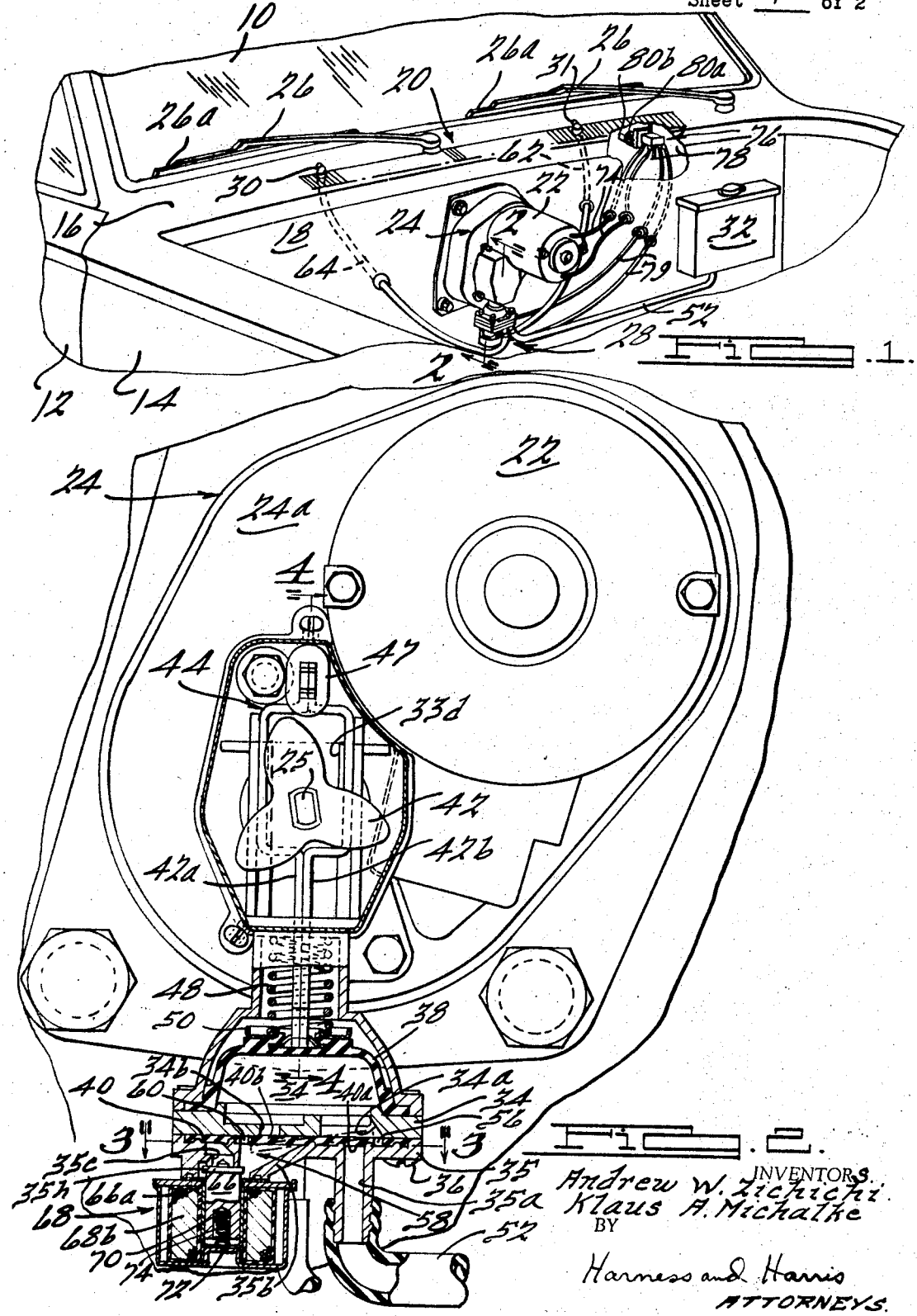

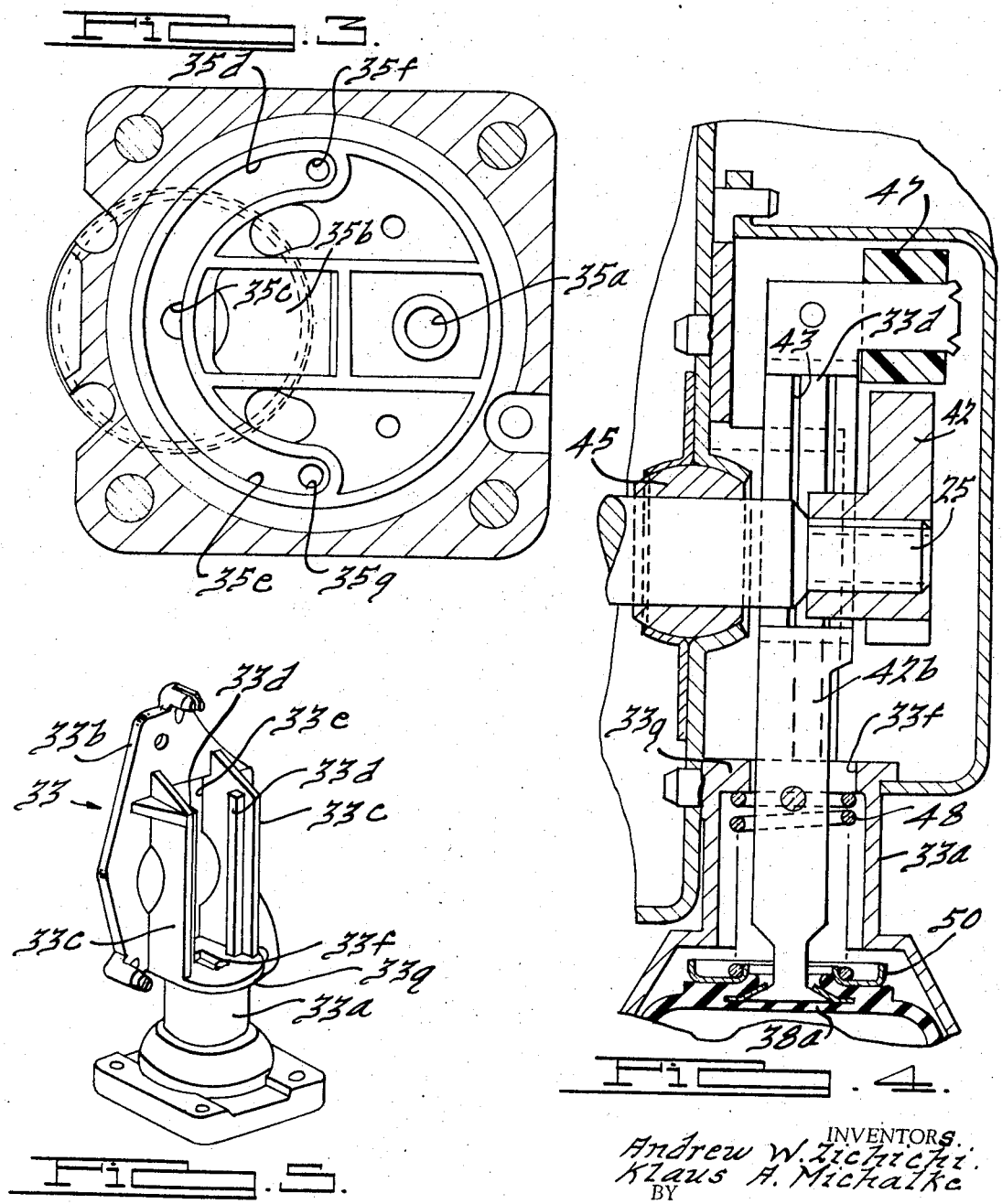

3,447,185
WINDSHIELD WIPING AND WASHING SYSTEM
Andrew W. Zichichi, Royal Oak, and Klaus A. Michalke, Utica, Mich., assignors to Chrysler Corporation, Highland Park, Mich., a corporation of Delaware
Filed July 5, 1966, Ser. No. 563,342
Int. Cl. B60s 1/48
U.S. Cl. 15—250.01                 8 Claims

ABSTRACT OF THE DISCLOSURE

A pump assembly for use as the washer pump in a windshield wiping and washing system for a motor vehicle. The discharge stroke of the pump diaphragm is effected by a yieldable driving connection between the motor shaft and the diaphragm and a solenoid valve is provided to selectively block discharge of fluid from the pressure chamber defined beneath the chamber diaphragm. The pressure chamber discharge may thus be blocked with the driving shaft rotating to trap pressure fluid in the pressure chamber and prevent discharge of the fluid from the chamber while the yieldable driving connection between the shaft and the diaphragm allows the motor shaft to continue to function to drive the wiper assembly.

---

This invention relates to pump assemblies and, more particularly, to a windshield washer pump assembly for a motor vehicle.

It is an object of the present invention to provide an improved pump assembly.

A further object is to provide a pump assembly especially suitable for use in a windshield washing system for a motor vehicle.

Yet another object is to provide an improved windshield wiping and washing system for a motor vehicle.

The pump assembly of the invention is of the type in which a diaphragm is moved alternately through intake and discharge strokes in response to rotation of a driven shaft. According to an important feature of the invention, the discharge stroke of the diaphragm is effected by a yieldable driving connection between the shaft and the diaphragm and means are provided to selectively block discharge of fluid from the pressure chamber defined by the pump diaphragm. With this arrangement, the pressure chamber discharge may be blocked with the driving shaft rotating to trap pressure fluid in the pressure chamber and prevent discharge of fluid from the pump while the yieldable driving connection between the shaft and diaphragm allows the shaft to continue rotating.

According to a further feature of the invention, the driving connection between the shaft and diaphragm for effecting an intake stroke of the latter comprises a cam on the shaft coacting with a cam follower carried by the diaphragm, and the driving connection between the shaft and diaphragm for effecting a discharge stroke of the latter comprises a spring biasing the cam follower for movement in a direction opposite to the direction in which it is moved by the cam on the shaft. Thus, when the discharge of the pressure chamber is blocked with the shaft rotating, the pressure fluid trapped in the pressure chamber prevents the spring from effecting a discharge stroke so that the cam follower is maintained in the remote position to which it had previously been moved by the cam on the shaft. In this position, the cam follower is merely lightly ticked by the cam on the shaft with each rotation of the latter so that the continued rotation of he shaft is not impeded by the cessation of the pump operation.

According to yet another feature of the invention, the aforedescribed pump assembly constitutes a portion of a windshield wiping and cleaning system for a motor vehicle. The windshield wiping and cleaning system includes a motor drivingly connected to the aforedescribed pump shaft, at least one wiper assembly also drivingly connected to the motor, a control switch for the motor accessible to an operator of the vehicle, at least one nozzle connected to the discharge of the pump and positioned to direct discharge fluid from the pump onto the windshield within the area wiped by the blade of the wiper assembly, and pump control means, including a control member accessible to the operator, operative in response to selective manipulation of the control member to actuate or deactuate the aforedescribed pump discharge blocking means.

During normal operaion of the vehicle, the motor control switch is left in a "motor off" position and the pump control member is left in a position to actuate the pump discharge blocking means. When it is desired to wipe the windshield, the motor control switch is moved to a "motor on" position to actuate the wiper assembly. The washer assembly does not operate at this time because the pump discharge is blocked. If it is thereafter desired to wash the windshield, the pump control member is moved to a position to deactuate the pump discharge blocking means, whereby to allow the motor shaft to operate the pump and deliver discharge fluid onto the windshield.

These and other objects, features and advantages of the invention will be apparent from the following detailed description of a preferred embodiment of the invention and from the accompanying drawings wherein:

FIG. 1 is a fragmentary perspective view of a motor vehicle embodying a windshield washing and cleaning system according to the invention;

FIG. 2 is a cross sectional view taken on line 2—2 of FIG. 1;

FIGS. 3 and 4 are cross sectional views taken on lines 3—3 and 4—4, respectively, of FIG. 2; and FIG. 5 is a perspective view of a part of the casing for the pump of the system of FIG. 1.

The motor vehicle seen fragmentarily in FIG. 1 includes a windshield 10, door 12, fender 14, cowl 16, dash panel 18, and a windshield wiping and cleaning system seen generally at 20.

System 20 includes an electric motor 22, a gear reduction unit 24 geared to the output shaft of motor 22 and having an output shaft 25 (FIG. 2), a pair of windshield wiper assemblies 26 drivingly connected by conventional means (not shown) to one end of output shaft 25, a pump assembly 28 driven from the other end of shaft 25, nozzles 30, 31 connected to the discharge of pump assembly 28 and positioned on cowl 16 to direct discharge fluid from pump assembly 28 onto windshield 10 within the area wiped by the blades 26a of wiper assemblies 26, and a liquid reservoir 32 storing fluid for delivery to the intake of pump assembly 28.

Pump assembly 28 includes a casing having three parts arranged in sandwich fashion. The upper part 33 is seen in assembled relationship in FIGS. 1, 2 and 4 and as a separate component part in FIG. 5. Part 33 includes a lower bell shaped portion 33a, a mounting plate portion 33b secured as by screws to the forward wall 24a of gear reduction unit 24, a pair of opposed wall portions 33c extending forwardly from mounting plate portion 33b, and a pair of vertically extending guide or tongue portions 33d formed on the inner confronting faces of wall portions 33c. The central casing part 34 is generally in the form of a rectangular plate and is positioned immediately beneath the open lower end of upper part 33. The lower casing part 35 is generally rectangular and is positioned immediately beneath central part 34. A plurality of screws 36 clamp casing parts 33, 34 and 35 together. In this clamped relationship, a pump diaphragm 38 of resilient material is clamped at its peripheral edge between upper and central casing portions 33, 34, and a sheet 40 of resilient material is clamped between central and lower casing portions 34, 35.

Pump assembly 28 further includes a three lobed cam 42 keyed to one end of gear reduction output shaft 25, and a cam follower assembly 44 adapted to coact with cam 42. Follower assembly 44 includes a pair of strips 42a and 42b suitably secured together at their upper and lower ends but bowed apart intermediate their ends to form a loop portion to pass gear reduction shaft 25. The bowed apart intermediate portions of strips 42a, b are also slotted at 43 to receive tongue portions 33d of casing part 33 whereby to guide follower assembly for vertical reciprocating movement within part 33. Shaft 25 is journaled in the forward wall 24a of gear reduction unit 24 by a plastic bushing 45 and passes through an opening 33e in mounting plate portion 33b of upper casing part 33. A cover 46 secured to mounting plate portion 33b of upper casing part 33 fits over cam 42 and the upper end of follower assembly 44. The lower portions of strips 42a, b pass slidably through a slot 33f in central partition 33g of part 33. The lower ends of strips 42a, 42b are bell shaped and are received in a pocket formed in the upper wall 38a of diaphragm 38. The upper ends of strips 42a, b, include leg portions which extend normal to the axis of shaft 24 and receive a plastic follow member 47 of oval configuration. It will be seen that follower assembly 44 and diaphragm 38 together define the plunger for the pump assembly.

A coil spring 48 is wound around the lower ends of strips 42a, b. Spring 48 bears at the upper end against the lower face of the partition 33g of casing part 33 and seats at its lower end in an annular cupped member 50 carried on the upper diaphragm wall 38a.

The lower part 35 of the pump casing includes a downwardly projecting hose fitting 35a to which an intake hose 52 from reservoir 32 is connected. The bore of fitting 35a lines up with an intake port 34a in central casing part 34 to provide an inlet passage extending from hose 52 to the pressure chamber 54 defined beneath diaphragm 38. Resilient sheet 40 is selectively pierced at 56 to define a flap portion 40a providing a check valve permitting flow of liquid into chamber 54 through port 34a but precluding flow of liquid out of the chamber through that port.

Central casing part 34 further includes a discharge port 34b connecting pressure chamber 54 to a discharge chamber 58 defined by a downwardly angled wall 35b of lower casing part 35. Resilient sheet 40 is further pierced at 60 to define another flap portion 40b providing a check valve permitting flow of liquid out of chamber 54 through port 34b but precluding flow of liquid into chamber 54 through that port.

Lower casing part 35 further provides a vertically extending bore 35c communicating at its lower end with discharge chamber 58 and at its upper end with a pair of arcuately extending passages 35d and 35e defined between casing part 35 and the lower face of resilient sheet 40. The ends of passages 35d and 35e remote from bore 35c communicate with the vertical bores of discharge pipe fittings 35f and 35g, respectively. Hoses 62 and 64 connect pipe fittings 35f and 35g to nozzles 30 and 31, respectively.

Communication between discharge chamber 58 and bore 35c is selectively controlled by a valve member in the form of the core 66 of an electromagnet 68 fixedly depending from lower casing part 35 in a position to define the lower boundary of discharge chamber 58. Electromagnet 68 further includes a coil spring 70 slidably received in a tubular sheath 72. Spring 70 is received in a pocket 74 formed in the lower end of core 66 and bears at its lower end against sheath 72 so as to continuously bias core 66 upwardly and urge a flange portion 66a on the upper end of the core into seating engagement with a peripheral lip 35h defining the lower end of vertical bore 35c.

A pair of electrical conductors 74 connect motor 22 with a switch assembly 76 mounted on the instrument panel 78 of the vehicle. A second pair of electrical conductors 79 connect the coil 68b of electromagnet 68 to switch assembly 76. Switch assembly 76 includes a composite control knob 80. Knob 80 includes an outer rotatable annular portion 80a and an inner axially movable button portion 80b. Assembly 76 functions in known manner to turn motor 22 on and off in response to selective rotation of annular knob portion 80a and to energize and deenergize coil 68b of electromagnet 68 in response to selective axial movement of button portion 80b. A spring (not shown) normally biases button portion 80b axially outwardly to a position in which coil 68b is deenergized.

During normal operation of the vehicle, motor control knob 80a is left in a "motor off" position and button portion 80b is biased outwardly to its coil deenergizing position. When it is desired to wipe the windshield, control knob 80a is rotated to actuate the wiper assembly. The pump assembly is not now operated since the fluid trapped in pressure chamber 54 by the seating engagement of core flange portion 66a against lip 35h prevents spring 48 from effecting a discharge stroke. Follower 47 is thus held in an out of the way position where it is merely lightly ticked by cam 42 as shaft 25 rotates so as not to impede the rotation of that shaft and the operation of the wiper assembly. One lobe of cam 42 may be made slightly longer than the other two so that follower 47 assumes an upper position determined by the length of the longer lobe, in which position it is cleared by the shorter lobes and is ticked during each shaft revolution by the single longer lobe.

When it is thereafter desired to wash the windshield, button portion 80b is pushed inwardly to energize coil 68b and draw core 66 downwardly to establish fluid communication between discharge chamber 58 and discharge bore 35c. Spring 48 is now able to effect discharge stroking of diaphragm 38 so that washer fluid is now delivered intermittently through hoses 62, 64 and nozzles 30, 31 onto windshield 10. This intermittent delivery of washer fluid continues so long as button portion 80b is maintained in a depressed position. As soon as this button portion is released, coil 68b is deenergized and core 66 moves upwardly under the urging of spring 70 into seating engagement with lip 35h, whereupon pump operation ceases despite the continuing rotation of shaft 34 and cam 42. Operation of the wiper assembly continues until knob 80a is moved to its "motor off" position.

While a preferred embodiment of the invention has been illustrated and described in detail, it is to be understood that various changes may be made in the disclosed embodiment without departing from the scope or spirit of the invention as defined by the appended claims.

We claim:
1. A pump assembly comprising
 (A) a driving member cyclically driven;
 (B) a pump having
  (1) a casing and
  (2) a plunger mounted for reciprocal movement within said casing and defining therewith a fluid pressure chamber;
 (C) means drivingly interconnecting said driving member and said plunger and operative in response to driving movement of said driving member through alternate first and second portions of its cycle to reciprocate said plunger through alternate intake and discharge strokes, whereby to alternately draw fluid into, and discharge fluid from, said chamber
  (1) said interconnecting means including yieldable means operative to allow movement of said driving member through a said second portion of its cycle without a corresponding movement of said plunger through a discharge stroke; and

(D) valve means operative to selectively block discharge of fluid from said chamber, whereby the fluid trapped in said chamber following an intake stroke precludes movement of said plunger through its discharge stroke while said yieldable means operates to allow continued cyclic movement of said driving member.

2. The pump assembly of claim 1 wherein:
(F) said driving member comprises a shaft driven by a motor; and
(G) said pump assembly constitutes a portion of a windshield wiping and cleaning system for a motor vehicle, said system further including:
  (1) at least one wiper assembly drivingly connected to said motor,
  (2) a control switch for said motor accessible to an operator of said vehicle,
  (3) at least one nozzle connected to the discharge of said pump and positioned to direct discharge fluid from said pump onto said windshield within the area wiped by the blade of said wiper assembly, and
  (4) pump control means, including a control member accessible to an operator of said motor vehicle, operative in response to selective manipulation of said control member to selectively control said valve means;
whereby said control switch may be operated to actuate said motor and drive said wiper assembly whereafter said control member may be manipulated to open said valve means to allow operation of said pump.

3. A pump assembly comprising:
(A) a driven shaft;
(B) a cam on said shaft;
(C) a pump having
  (1) a casing,
  (2) a diaphragm carried by said casing,
  (3) a fluid pressure chamber defined by said diaphragm and said casing, and
  (4) means defining separate intake and discharge ports communicating with said chamber;
(D) a cam follower mounted for reciprocal movement, said follower being positioned for engagement by said cam for movement in one direction;
(E) spring means biasing said follower for movement in the opposite direction;
(F) means operative
  (1) in response to movement of said cam follower in said one direction to move said diaphragm in a direction to expand said chamber, whereby to effect an intake stroke of said pump and draw fluid into said chamber through said intake port, and
  (2) in response to movement of said cam follower in said opposite direction to move said diaphragm in a direction to collapse said chamber, whereby to effect a discharge stroke of said pump and discharge fluid from said chamber through said discharge port; and
(G) a valve member selectively movable between
  (1) a first position in which it blocks discharge of fluid from said chamber, and
  (2) a second position in which it allows free discharge of fluid from said chamber, whereby, with said valve member in said second position, rotation of said output shaft produces intermittent discharge of fluid from said pump and, with said valve member in said first position, said spring means are prevented from effecting a discharge stroke of said pump so that said output shaft may rotate continuously without producing operation of said pump.

4. A pump assembly according to claim 3 and further including:
(H) control means, including a solenoid, operative upon energization and deenergization of said solenoid to selectively move said valve member between its aforesaid positions.

5. A pump assembly according to claim 4 wherein:
(I) said control means includes
  (1) spring means normally biasing said valve member to its said first position, and
  (2) means operative in response to energization of said solenoid to move said valve member to its said second position.

6. A pump assembly according to claim 3 wherein:
(H) said cam includes a plurality of lobes, whereby, with said valve member in its said second position, said pump undergoes a plurality of operating cycles in response to each revolution of said output shaft.

7. The pump assembly of claim 3 wherein:
(H) said shaft is driven by a motor; and
(I) said pump assembly constitutes a portion of a windshield wiping and cleaning system for a motor vehicle, said system further including:
  (1) at least one wiper assembly drivingly connected to said motor,
  (2) a control switch for said motor accessible to an operator of said vehicle,
  (3) at least one nozzle connected to the discharge of said pump and positioned to direct discharge fluid from said pump onto said windshield within the area wiped by the blade of said wiper assembly, and
  (4) pump control means, including a control member accessible to an operator of said motor vehicle, operative in response to selective manipulation of said control member to move said valve member between its aforesaid positions,
whereby said control switch may be operated to actuate said motor and drive said wiper assembly, whereafter said control member may be manipulated to move said valve member to its said second position to allow operation of said pump.

8. A windshield wiping and cleaning system according to claim 7 wherein:
(I) said pump control means includes:
  (1) means normally biasing said valve member to its aforesaid first position, and
  (2) a solenoid operative when energized to move said valve member to its said second position; and
(J) said control member comprises a switch closing an electrical circuit to said solenoid.

References Cited
UNITED STATES PATENTS

| | | | |
|---|---|---|---|
| 2,306,778 | 12/1942 | Carney | 15—250.01 |
| 2,323,470 | 7/1943 | Horton et al. | 15—250.01 |
| 2,407,215 | 9/1946 | Anderson | 15—250.02 |
| 2,636,206 | 4/1953 | Oishei | 15—250.01 |
| 2,816,316 | 12/1957 | Oishei | 15—250.02 |
| 3,014,814 | 12/1961 | McConica | 15—250.01 XR |
| 3,078,493 | 2/1963 | Ryck et al. | 15—250.02 |
| 3,089,204 | 5/1963 | Fingeroot et al. | 15—250.01 |
| 2,114,558 | 4/1938 | Dismukes | 15—250.01 |
| 2,878,505 | 3/1959 | Ziegler | 103—148 XR |
| 3,259,069 | 7/1966 | Rogakos | 103—148 |

WALTER A. SCHEEL, *Primary Examiner.*

R. I. SMITH, *Assistant Examiner.*